(12) United States Patent
Disteldorf et al.

(10) Patent No.: US 10,100,202 B2
(45) Date of Patent: Oct. 16, 2018

(54) COATED ARTICLE WITH IR REFLECTING LAYER AND METHOD OF MAKING SAME

(71) Applicants: Guardian Europe S.a.r.l, Bertrange (LU); Guardian Industries UK Ltd., Goole, East of Riding of Yorkshire (GB)

(72) Inventors: Bernd Disteldorf, Mettlach (DE); Anton Dietrich, Fontnas (CH); Robert Baker, Goole (GB); Stuart Silvester, Goole (GB); Eduardo Sanz, Goole (GB)

(73) Assignees: Guardian Europe S.a.r.l., Bertrange (LU); Guardian Industries UK Ltd., East Riding of Yoshire (GB)

( * ) Notice: Subject to any disclaimer, the term of this patent is extended or adjusted under 35 U.S.C. 154(b) by 42 days.

(21) Appl. No.: 15/256,872

(22) Filed: Sep. 6, 2016

(65) Prior Publication Data
US 2018/0066142 A1 Mar. 8, 2018

(51) Int. Cl.
| | |
|---|---|
| *C03C 17/36* | (2006.01) |
| *E06B 3/66* | (2006.01) |
| *C09D 5/33* | (2006.01) |
| *C09D 4/00* | (2006.01) |

(Continued)

(52) U.S. Cl.
CPC ............ *C09D 5/004* (2013.01); *C03C 17/366* (2013.01); *C03C 17/3626* (2013.01); *C03C 17/3644* (2013.01); *C03C 17/3681* (2013.01); *C09D 1/00* (2013.01); *C09D 4/00* (2013.01); *E06B 3/6612* (2013.01); *E06B 3/6715* (2013.01); *C03C 2217/211* (2013.01); *C03C 2217/212* (2013.01); *C03C 2217/23* (2013.01); *C03C 2217/256* (2013.01); *C03C 2217/281* (2013.01); *C03C 2217/74* (2013.01); *C03C 2218/154* (2013.01)

(58) Field of Classification Search
CPC .. C09D 5/004; C09D 1/00; C09D 4/00; E06B 3/6612; E06B 3/6715; C03C 17/3644; C03C 17/366; C03C 17/3681; C03C 17/3626; C03C 2217/256; C03C 2217/74; C03C 2217/212; C03C 2217/211; C03C 2217/281; C03C 2217/23; C03C 2218/154
See application file for complete search history.

(56) References Cited

U.S. PATENT DOCUMENTS

| | | |
|---|---|---|
| 5,821,001 A | 10/1998 | Arbab et al. |
| 6,291,867 B1 * | 9/2001 | Wallace ............ H01L 21/28185 257/310 |
| 7,153,578 B2 | 12/2006 | Chonlamaitri et al. |

(Continued)

*Primary Examiner* — Donald J Loney
(74) *Attorney, Agent, or Firm* — Nixon & Vanderhye P.C.

(57) ABSTRACT

A coated article is provided with a low-emissivity (low-E) coating on a glass substrate. The low-E coating includes an infrared (IR) reflecting layer between at least a pair of dielectric layers. The IR reflecting layer may be of silver or the like. The coating is designed so as to provide a highly transparent coated article that is thermally stable upon optional heat treatment and which can be made to have a low emissivity in a consistent manner. The coating is designed to have improved IR reflecting layer quality, and thus reduced tolerances with respect to manufacturability of desired emissivity values. The coated article may be used in monolithic window applications, IG window applications, or the like.

28 Claims, 3 Drawing Sheets

(51) Int. Cl.
*C09D 1/00* (2006.01)
*E06B 3/67* (2006.01)

(56) References Cited

U.S. PATENT DOCUMENTS

| | | |
|---|---|---|
| 7,198,851 B2 | 4/2007 | Lemmer et al. |
| 7,390,572 B2 | 6/2008 | Butz et al. |
| 7,419,725 B2 | 9/2008 | Neuman et al. |
| 7,592,068 B2 | 9/2009 | Disteldorf et al. |
| 7,964,284 B2 | 6/2011 | Blacker et al. |
| 8,263,227 B2 | 9/2012 | Disteldorf et al. |
| 8,440,310 B2 | 5/2013 | Ferreira et al. |
| 9,028,956 B2 | 5/2015 | Knoll et al. |
| 9,297,197 B2 | 3/2016 | Lao et al. |
| 9,302,936 B2 | 4/2016 | Wuillaume et al. |
| 2004/0224167 A1* | 11/2004 | Stachowiak ...... B32B 17/10174 428/432 |
| 2006/0121290 A1 | 6/2006 | Chonlamaitri et al. |
| 2011/0117300 A1 | 5/2011 | Wagner |
| 2012/0087005 A1 | 4/2012 | Reymond et al. |
| 2016/0221868 A1 | 8/2016 | Goodwin et al. |

* cited by examiner

COATED ARTICLE WITH IR REFLECTING LAYER AND METHOD OF MAKING SAME

This invention relates to a coated article having a low-emissivity (low-E) coating including an infrared (IR) reflecting layer of or including a material such as silver or the like. The low-E coating is designed so that the coated article can realize one or more of: high visible transmission, consistent and low emissivity values, thermal stability upon optional heat treatment such as thermal tempering, a low U-value, and desirable coloration and/or reflectivity values. Coated articles herein may be used in the context of insulating glass (IG) window units, or in other suitable applications such as monolithic window applications, laminated windows, and/or the like.

BACKGROUND AND SUMMARY OF EXAMPLE EMBODIMENTS OF THE INVENTION

Coated articles are known in the art for use in window applications such as insulating glass (IG) window units, vehicle windows, monolithic windows, and/or the like. In certain example instances, designers of coated articles often strive for a combination of high visible transmission, desirable color, low emissivity (or emittance), low sheet resistance ($R_s$), and/or low U-values in the context of IG window units. High visible transmission and desired coloration may permit coated articles to be used in applications where these characteristics are desired such as in IG or vehicle window applications, whereas low emissivity and low sheet resistance permit such coated articles to block significant amounts of IR radiation so as to reduce for example undesirable heating of vehicle or building interiors.

Low-E coatings are typically deposited on a glass substrate by sputtering. Emissivity and/or sheet resistance values of a coating or coated article are driven in large part by the IR reflecting layer(s) which is/are typically made of silver or the like. However, it has been difficult to achieve low tolerance variation with respect to emissivity values of such coatings. In other words, a problem in the art has been difficulty in achieving a desired low emissivity value and/or sheet resistance value within a given small tolerance variation. The tolerance variation has been larger than desired.

In view of the above, it will be appreciated that there exists a need in the art for a coated article including a low-E coating that is designed so that a desired low emissivity value can be achieved within a given small tolerance range (e.g., a tolerance of plus/minus 1%). It would also be desirable to provide such a coating that also achieves one or more of: high visible transmission, low emissivity, thermal stability upon optional heat treatment such as thermal tempering, a low U-value, and desirable coloration and/or reflectivity values.

In certain example embodiments of this invention, it has surprisingly been found that the provision of a layer of or including zirconium silicon oxynitride in the lower dielectric portion of the coating, between the glass substrate and the IR reflecting layer (e.g., of silver or the like) unexpectedly improves the quality of the IR reflecting layer thereby permitting the coated article to realized low emissivity values with low tolerance variations. Providing zirconium silicon oxynitride under a layer of or including zinc stannate and under a layer of or including zinc oxide, in the lower dielectric portion of the coating, has surprisingly been found to improve the quality of the silver and thus lower emissivity values and lower emissivity tolerance values in a desirable manner. Even though the zirconium silicon oxynitride is not directly contacting the IR reflecting layer, it still surprisingly improves the quality of the overlying IR reflecting layer thereby permitting thermal properties of the coating to be improved and manufactured in a more consistent manner. The IR reflecting layer has been found to grow better and have a smoother base which can more easily be repeated on a consistent basis. It has also been surprisingly found that the provision of a layer of or including titanium oxide (e.g., $TiO_2$) over the zirconium silicon oxynitride unexpectedly results in an increase in visible transmission of the coated article and improved optical properties, as well as an increase in line speed.

In certain example embodiments of this invention, there is provided a coated article including a coating supported by a glass substrate, the coating comprising moving away from the glass substrate: a dielectric layer comprising zirconium silicon oxynitride; a layer comprising titanium oxide; a layer comprising zinc stannate; a layer comprising zinc oxide located over and directly contacting the layer comprising zinc stannate; an infrared (IR) reflecting layer comprising silver located on the substrate over and directly contacting the layer comprising zinc oxide; and a layer comprising metal oxide located over at least the IR reflecting layer comprising silver; wherein the coating contains only one silver based IR reflecting layer; wherein the coating has a normal emissivity ($E_n$) of no greater than 7%, and measured monolithically the coated article has a visible transmission of at least 75%.

In certain example embodiments of this invention there is provided a coated article including a coating supported by a glass substrate, the coating comprising moving away from the glass substrate: a dielectric layer comprising zirconium silicon oxynitride; a layer comprising zinc stannate; a layer comprising zinc oxide located over and directly contacting the layer comprising zinc stannate; an infrared (IR) reflecting layer comprising silver located on the substrate over and directly contacting the layer comprising zinc oxide; and a layer comprising metal oxide located over at least the IR reflecting layer comprising silver; wherein the layer comprising zirconium silicon oxynitride contains at least three times as much nitrogen as oxygen, and wherein a ratio of Zr/Si (atomic) is from 0.30 to 0.47 in the layer comprising zirconium silicon oxynitride.

In certain example embodiments of this invention, there is provided an IG window unit comprising: first and second glass substrates with a gap therebetween; a coating supported by the second glass substrate and facing the gap, the second glass substrate to be located closer to a building interior than is the first glass substrate, the coating comprising moving away from the second glass substrate: a dielectric layer comprising zirconium silicon oxynitride; a layer comprising titanium oxide; a layer comprising zinc stannate; a layer comprising zinc oxide located over and directly contacting the layer comprising zinc stannate; an infrared (IR) reflecting layer comprising silver located on the substrate over and directly contacting the layer comprising zinc oxide; and a layer comprising metal oxide located over at least the IR reflecting layer comprising silver; wherein the coating contains only one silver based IR reflecting layer; wherein the coating has a normal emissivity ($E_n$) of no greater than 7%; wherein the IG window unit has a visible transmission of at least 70% and a U-value of no greater than 1.4.

DETAILED DESCRIPTION OF EXAMPLE EMBODIMENTS OF THE INVENTION

Referring now to the drawings in which like reference numerals indicate like parts throughout the several views.

Coated articles herein may be used in applications such as monolithic windows, IG window units that include a monolithic coated article, vehicle windows, and/or any other suitable application that includes single or multiple substrates such as glass substrates.

Certain embodiments of this invention relate to a coated article having a low-emissivity (low-E) coating supported by a glass substrate, the low-E coating including an infrared (IR) reflecting layer of or including silver or the like. The low-E coating is designed so that the coated article can realize one or more of: high visible transmission, consistent and low emissivity values, thermal stability upon optional heat treatment such as thermal tempering, a low U-value, and desirable coloration and/or reflectivity values.

In certain example embodiments of this invention, it has surprisingly been found that the provision of a layer of or including zirconium silicon oxynitride 2 in the lower dielectric portion of the coating 25, between the glass substrate 1 and the IR reflecting layer (e.g., of silver or the like) 9 unexpectedly improves the quality of the IR reflecting layer 9 thereby permitting the coated article to realized low emissivity values with low tolerance variations. In particular, providing zirconium silicon oxynitride 2 under a layer of or including zinc stannate (5 and/or 5') and under a layer of or including zinc oxide (7 and/or 7'), in the lower dielectric portion of the coating 25, has surprisingly been found to improve the quality of the silver and thus improve (lower) emissivity and lower emissivity tolerance values as discussed herein. Even though the zirconium silicon oxynitride 2 is not directly contacting the IR reflecting layer 9, it still surprisingly improves the quality of the overlying IR reflecting layer 9 thereby permitting thermal properties of the coating to be improved and manufactured in a more consistent manner. The IR reflecting layer 9 has been found to grow better and have a smoother base which can more easily be repeated on a consistent basis. It has also been surprisingly found that the provision of a layer of or including titanium oxide (e.g., $TiO_2$) 3 over the zirconium silicon oxynitride 2 unexpectedly results in an increase in visible transmission of the coated article and improved optical properties, as well as an increase in line speed.

The terms "heat treatment" and "heat treating" as used herein mean heating the article to a temperature sufficient to achieve thermal tempering, heat bending, and/or heat strengthening of the glass inclusive article. This definition includes, for example, heating a coated article in an oven or furnace at a temperature of least about 580 degrees C., more preferably at least about 600 degrees C., for a sufficient period to allow tempering, bending, and/or heat strengthening. In certain instances, the HT may be for at least about 4 or 5 minutes. The coated article may or may not be heat treated in different embodiments of this invention.

Figure 1:
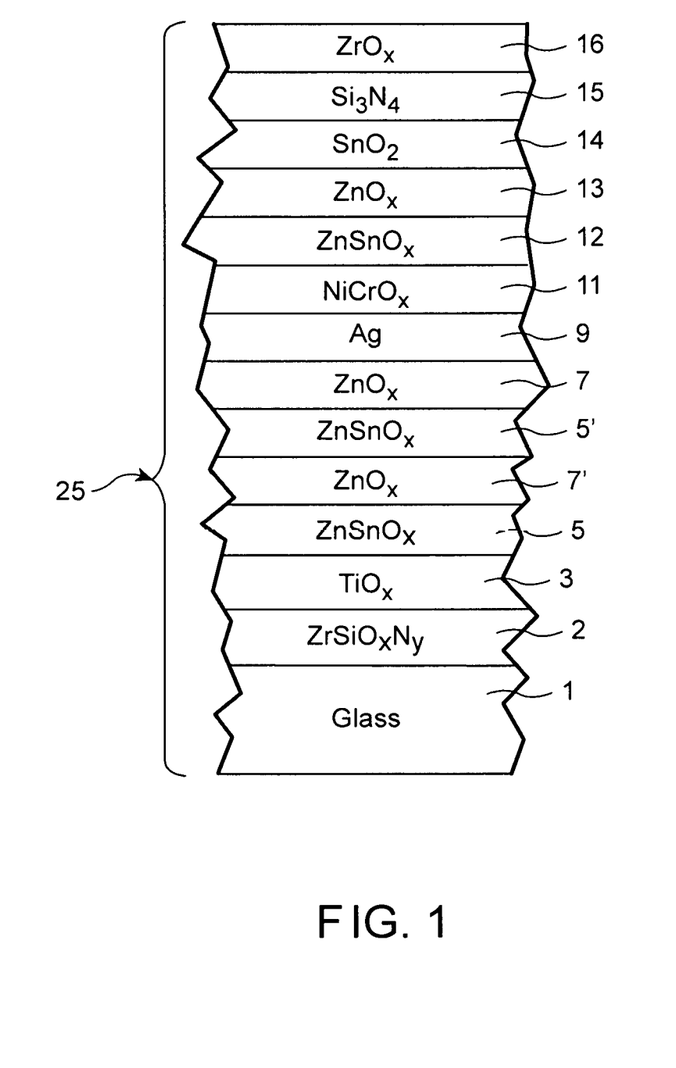
FIG. 1 is a cross sectional view of a coated article according to an example embodiment of this invention.

FIG. 1 is a cross sectional view of a coated article according to an example embodiment of this invention. The coated article includes glass substrate 1 (e.g., clear, green, bronze, or blue-green glass substrate from about 1.0 to 10.0 mm thick, more preferably from about 1.0 mm to 6.0 mm thick, with an example glass substrate being a clear glass substrate about 3.8 to 4.0 mm thick), and a multi-layer low-E coating (or layer system) 25 provided on the substrate 1 either directly or indirectly. As shown in FIG. 1, the coating 25 includes: dielectric layer of or including zirconium silicon oxynitride 2, dielectric layer of or including titanium oxide (e.g., $TiO_2$) 3, dielectric layers 5 and 5' of or including zinc stannate, dielectric layers 7 and 7' of or including zinc oxide, IR reflecting layer 9 of or including silver, gold, or the like, upper contact layer 11 of or including Ni, Cr, NiCr, NiCrMo, or any oxide thereof such as an oxide of NiCr or an oxide of NiCrMo, dielectric layer 12 of or including a metal oxide such as zinc stannate or the like, dielectric layer 13 of or including a metal oxide such as zinc oxide or the like, dielectric layer 14 of or including a metal oxide such as tin oxide (e.g., $SnO_2$), zinc stannate, or the like, dielectric layer 15 of or including a material such as silicon nitride (e.g., $Si_3N_4$) and/or silicon oxynitride, and an optional dielectric layer 16 of a material such as zirconium oxide (e.g., $ZrO_2$) which may in certain example instances be a protective overcoat. Other layers and/or materials may additionally be provided in certain example embodiments of this invention, and it is also possible that certain layers may be removed or split in certain example instances. For example, optionally a layer of or including silicon nitride and/or silicon oxynitride (not shown) may be provided between the glass substrate 1 and the zirconium silicon oxynitride 2. Moreover, other materials may be used for particular layers instead of the materials mentioned above in certain example embodiments of this invention.

Figure 2:
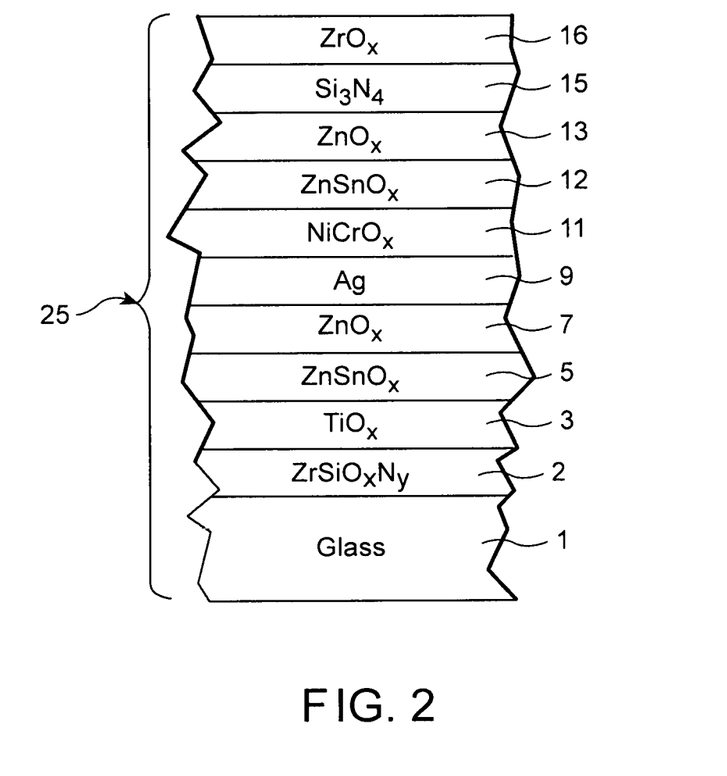
FIG. 2 is a cross sectional view of a coated article according to another example embodiment of this invention.

FIG. 2 is a cross sectional view of a coated article according to another example embodiment of this invention. The FIG. 2 embodiment has the same layer stack as the FIG. 1 embodiment, except that layers 5,' 7' and 14 from FIG. 1 are not present in the FIG. 2 embodiment. In the FIG. 2 embodiment, the silver-based IR reflecting layer may be thicker than in the FIG. 1 embodiment in certain instances so as to result in a coated article have a lower emissivity, lower sheet resistance, and lower U-value. It is also possible for silicon nitride inclusive layer 15 to be thicker in the FIG. 2 embodiment, compared to the FIG. 1 embodiment, to make up for the lack of layer 14 in the FIG. 2 embodiment. These example modifications are reflected in examples discussed below.

Figure 3:
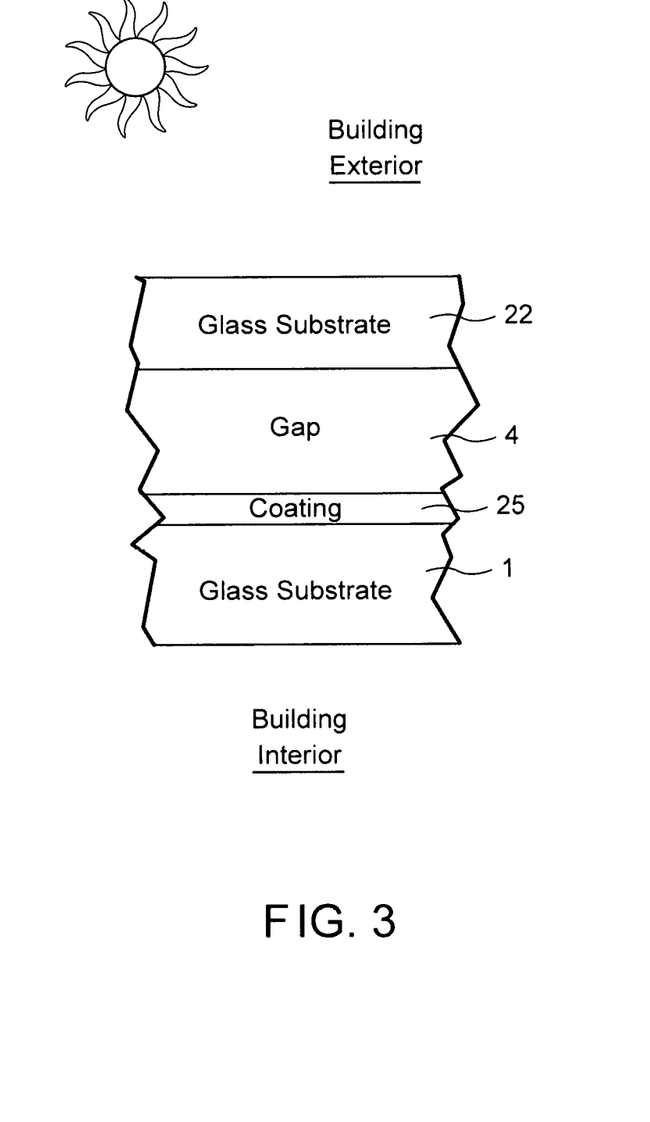
FIG. 3 is a cross sectional view of part of an insulating glass (IG) window unit including the monolithic coated article of FIG. 1 or FIG. 2 according to an example embodiment of this invention.

In monolithic instances, the coated article includes only one substrate such as glass substrate 1 (see FIGS. 1-2). However, monolithic coated articles herein may be used in devices such as IG window units for example. Typically, as shown in FIG. 3, an IG window unit may include two spaced apart glass substrates 1 and 22, with a gap 4 defined therebetween. Example IG window units are illustrated and described, for example, in U.S. Pat. Nos. 5,770,321, 5,800, 933, 6,524,714, 6,541,084 and US 2003/0150711, the disclosures of which are all hereby incorporated herein by reference. An example IG window unit as shown in FIG. 3 may include, for example, the coated glass substrate 1 shown in either FIG. 1 or FIG. 2 coupled to another glass substrate 22 via spacer(s), sealant(s) or the like with a gap 4 being defined therebetween. This gap 4 between the substrates in IG unit embodiments may in certain instances be filled with a gas such as argon (Ar), or a mixture of air and argon gas. An example IG unit may comprise a pair of spaced apart substantially clear glass substrates each about 4 mm (e.g., 3.8 mm) thick one of which is coated with a coating 25 herein in certain example instances, where the gap 4 between the substrates may be from about 5 to 30 mm, more preferably from about 10 to 20 mm, and most preferably about 16 mm. In certain example instances, the coating 25 may be provided on the side of the inner glass substrate 1 facing the gap (although the coating may be on the other substrate in certain alternative embodiments) as shown in FIG. 3, which is often referred to as surface three of the IG window unit.

In certain example IG unit embodiments of this invention, the coating 25 is designed such that the resulting IG unit (e.g., with, for reference purposes, a pair of 3.8 mm clear glass substrates 1, 22 spaced apart by 16 mm with a mixture of air and Ar gas in the gap) has a U-value of no greater than 1.4 W/(m$^2$K), more preferably no greater than 1.3 W/(m$^2$K), sometimes no greater than 1.1 W/(m$^2$K), and sometimes no greater than 1.0 W/(m$^2$K). U-value herein is measured and referred to in accordance with EN 410-673_2011—Winter, the disclosure of which is hereby incorporated herein by reference. Indeed, it is preferred that the optical and thermal features discussed herein are achieved when the coating 25 contains only one silver-based IR reflecting layer (e.g., as shown in FIGS. 1-2), as opposed to a double or triple-silver layer stack.

As mentioned above, it has surprisingly been found that the provision of a layer of or including zirconium silicon oxynitride 2, in combination with the zinc stannate and zinc oxide, in the lower dielectric portion of the coating 25, between the glass substrate 1 and the IR reflecting layer (e.g., of silver or the like) 9 unexpectedly improves the quality of the IR reflecting layer 9 thereby permitting the coated article to realized low emissivity values with lower tolerance variations. For example, a low emissivity value (e.g., 4%) with a plus/minus 1% tolerance can be surprisingly achieved using zirconium silicon oxynitride 2 in combination with the zinc stannate (5 and/or 5') and zinc oxide (7 and/or 7') between the glass substrate 1 and the IR reflecting layer; but emissivity within the 1% tolerance cannot be achieved without using this combination of layers. This is a surprisingly and unexpected improvement in the art. Even though the zirconium silicon oxynitride 2 is not directly contacting the IR reflecting layer 9, it still surprisingly improves the quality of the overlying IR reflecting layer 9 thereby permitting thermal properties of the coating to be improved and manufactured in a more consistent manner.

The nitrogen/oxygen ratio in the zirconium silicon oxynitride layer 2 has been found to be significant. In particular, too much oxygen in zirconium silicon oxynitride layer 2 results in a reduced sputter rate and does not seem to help reduce absorption or increase transmissions. Too much oxygen in this layer 2 has also been found to result in undesirable haze. Accordingly, in certain example embodiments of this invention, the layer 2 of or including zirconium silicon oxynitride has a nitrogen to oxygen ratio (nitrogen/oxygen ratio) of at least 3, more preferably at least 4, and even more preferably at least 5 (atomic). Thus, layer 2 contains at least three times more N than O, more preferably at least four times as much N than O, and most preferably at least five times as much N than O. For example in certain example embodiments of this invention, layer 2 is sputter-deposited using a ZrSi target, using from about 0.4 to 2.0, more preferably from about 0.5 to 1.5, and most preferably about 0.8 to 1.0 ml/kW O$_2$ gas, and from about 4.0 to 10.0, more preferably from about 5.0 to 8.0, and most preferably from about 6.0 to 7.0 ml/kW N$_2$ gas. Argon (Ar) gas may also be used in the sputtering process.

Moreover, it has also been found that, in zirconium silicon oxynitride layer 2, too much Zr results in an undesirably brittle material and too little Zr causes the silver layer 9 to be not as smooth and degrades coating qualities. It has been found that better results in these respects are achieved when the layer 2 contains more Si than Zr (atomic %). For example, the Zr/Si (atomic) ratio in layer 2 (and in the sputtering target for depositing layer 2) is preferably from 0.20 to 0.60, more preferably from 0.30 to 0.47, and most preferably from 0.35 to 0.44. For example, a sputtering target(s) containing about 40% Zr and about 60% Si may be used to sputter-deposit layer 2.

Dielectric layer 3 may be of or include titanium oxide in certain example embodiments of this invention. The titanium oxide of layer 3 may in certain example instances be represented by TiO$_x$, where x is from 1.5 to 2.5, most preferably about 2.0. The titanium oxide may be deposited via sputtering or the like in different embodiments. In certain example instances, dielectric layer 3 may have an index of refraction (n), at 550 nm, of at least 2.0, more preferably of at least 2.1, and possibly from about 2.3 to 2.6 when the layer is of or includes titanium oxide. In certain embodiments of this invention, the thickness of titanium oxide inclusive layer 3 is controlled so as to allow a* and/or b* color values (e.g., transmissive, film side reflective, and/or glass side reflective) to be fairly neutral (i.e., close to zero) and/or desirable. Other materials may be used in addition to or instead of titanium oxide in certain example instances. In certain alternative embodiments, the Ti in oxide layer 3 may be replaced with another metal.

In example embodiments, the dielectric zinc stannate (e.g., ZnSnO, Zn$_2$SnO$_4$, or the like) based layers 5, 5' and/or 12 may include more Zn than Sn by weight. For example, the metal content of one or more of these zinc stannate based layers may include from about 51-90% Zn and from about 10-49% Sn, more preferably from about 51-70% Zn and from about 30-49% Sn, with an example being about 52% Zn and about 48% Sn (weight %, in addition to the oxygen in the layer) in certain example embodiments of this invention. Thus, for example, the zinc stannate based layers may be sputter-deposited using a metal target comprising about 52% Zn and about 48% Sn in certain example embodiments of this invention. Optionally, the zinc stannate based layer 14 may be doped with other metals such as Al or the like. In certain optional embodiments, it is possible to dope the zinc stannate (e.g., ZnSnO) with other materials such as Al, Zn, N, or the like. The zinc stannate based layers are substantially or substantially fully oxidized in preferred embodiments of this invention.

Layers 7, 7', and 13 in certain embodiments of this invention are of or include zinc oxide (e.g., ZnO). The zinc oxide of these layers may contain other materials as well such as Al (e.g., to form ZnAlO$_x$). For example, in certain example embodiments of this invention, one or more of zinc oxide layers 7, 7', 13 may be doped with from about 1 to 10% Al, more preferably from about 1 to 5% Al, and most preferably about 1 to 4% Al. The zinc oxide layer(s) 7 and/or 7', in combination with the zinc stannate (5 and/or 5') and zirconium silicon oxynitride 2, helps improve silver quality of layer 9 and emissivity characteristics of the coating 25 as explained herein.

Dielectric layer 15 may be of or include silicon nitride in certain embodiments of this invention. Silicon nitride layer 15 may, among other things, improve heat-treatability of the coated articles, e.g., such as thermal tempering or the like, and may or may not include some oxygen. The silicon nitride of layer 15 may be of the stoichiometric type (i.e., $Si_3N_4$), or alternatively of the Si-rich type in different embodiments of this invention.

Infrared (IR) reflecting layer 9 is preferably substantially or entirely metallic and/or conductive, and may comprise or consist essentially of silver (Ag), gold, or any other suitable IR reflecting material. IR reflecting layer 9 helps allow the coating to have low-E and/or good solar control characteristics. The IR reflecting layers may, however, be slightly oxidized in certain embodiments of this invention and may optionally be doped with other material such as Pd or the like. Coating 25 preferably contains only one silver-based IR reflecting layer 9 in preferred embodiments of this invention.

The upper contact layer 11 may be of or include nickel (Ni) oxide, chromium/chrome (Cr) oxide, or a nickel alloy oxide such as nickel chrome oxide ($NiCrO_x$), or other suitable material(s) such as Ni, Ti or an oxide of Ti, or $NiTiO_x$, in certain example embodiments of this invention. The use of, for example, $NiCrO_x$ in these layers allows durability to be improved. The $NiCrO_x$ of these layers may be fully oxidized in certain embodiments of this invention (i.e., fully stoichiometric), or alternatively may only be partially oxidized (i.e., sub-oxide). In certain instances, the $NiCrO_x$ layer 11 may be at least about 50% oxidized. Descriptions of various types of oxidation graded contact layers that may optionally be used are set forth in U.S. Pat. No. 6,576,349, the disclosure of which is hereby incorporated herein by reference. Contact layer 11 may or may not be continuous in different embodiments of this invention across the entire underlying IR reflecting layer 9.

Transparent dielectric layer 14 may be of or include tin oxide in certain example embodiments of this invention. However, it may be doped with certain other materials in other example embodiments, such as with Al or Zn in certain example alternative embodiments.

Optionally, a protective overcoat layer such as zirconium oxide (e.g., $ZrO_2$) may be provided as layer 16 as the uppermost layer of the coating 25. This layer need not be provided in all embodiments. Protective overcoat 16 may instead be made of zirconium silicon oxynitride or silicon oxynitride in alternative embodiments of this invention.

Other layer(s) below or above the illustrated coating may also be provided. Thus, while the layer system or coating is "on" or "supported by" substrate 1 (directly or indirectly), other layer(s) may be provided therebetween. Thus, for example, the coating of FIG. 1 or FIG. 2 may be considered "on" and "supported by" the substrate 1 even if other layer(s) are provided between layer 2 and substrate 1. Moreover, certain layers of the illustrated coating may be removed in certain embodiments, while others may be added between the various layers or the various layer(s) may be split with other layer(s) added between the split sections in other embodiments of this invention without departing from the overall spirit of certain embodiments of this invention.

While various thicknesses may be used in different embodiments of this invention, example thicknesses and materials for the respective layers on the glass substrate 1 in the FIG. 1 embodiment are as follows, from the glass substrate 1 outwardly (e.g., the Al content in the zinc oxide layers may be from about 1-10%, more preferably from about 1-3% in certain example instances):

TABLE 1

(Example Materials/Thicknesses; FIG. 1 Embodiment)

| Layer | Preferred Range (Å) | More Preferred (Å) | Example (Å) |
|---|---|---|---|
| $ZrSiO_xN_y$ (layer 2) | 40-250 (or 20-250) Å | 50-100 Å | 74 Å |
| $TiO_x$ (layer 3) | 15-150 Å | 20-60 Å | 30 Å |
| ZnSnO (layer 5) | 20-150 Å | 35-70 Å | 53 Å |
| $ZnAlO_x$ (layer 7') | 20-150 Å | 30-70 Å | 48 Å |
| ZnSnO (layer 5') | 15-150 Å | 25-60 Å | 41 Å |
| $ZnAlO_x$ (layer 7) | 60-170 Å | 80-140 Å | 123 Å |
| Ag (layer 9) | 50-120 Å | 70-100 Å | 87 Å |
| $NiCrO_x$ (layer 11) | 10-80 Å | 20-70 Å | 30 Å |
| ZnSnO (layer 12) | 30-130 Å | 50-80 Å | 66 Å |
| $ZnAlO_x$ (layer 13) | 80-250 Å | 130-240 Å | 170 Å |
| $SnO_2$ (layer 14) | 15-150 Å | 30-80 Å | 55 Å |
| $Si_3N_4$ (layer 15) | 50-350 Å | 80-200 Å | 111 Å |
| $ZrO_2$ (layer 16) | 10-60 Å | 20-40 Å | 30 Å |

Turning to the FIG. 2 embodiment, while various thicknesses may be used in different embodiments of this invention, example thicknesses and materials for the respective layers on the glass substrate 1 in the FIG. 2 embodiment are as follows, from the glass substrate 1 outwardly (e.g., the Al content in the zinc oxide layers may be from about 1-10%, more preferably from about 1-3% in certain example instances):

TABLE 2

(Example Materials/Thicknesses; FIG. 2 Embodiment)

| Layer | Preferred Range (Å) | More Preferred (Å) | Example (Å) |
|---|---|---|---|
| $ZrSiO_xN_y$ (layer 2) | 40-250 (or 20-250) Å | 50-100 Å | 74 Å |
| $TiO_x$ (layer 3) | 15-150 Å | 20-60 Å | 36 Å |
| ZnSnO (layer 5) | 10-150 Å | 15-55 Å | 22 Å or 31 Å |
| $ZnAlO_x$ (layer 7) | 60-170 Å | 80-140 Å | 73 Å or 88 Å |
| Ag (layer 9) | 50-250 Å | 100-220 Å | 115 Å or 196 Å |
| $NiCrO_x$ (layer 11) | 10-80 Å | 20-70 Å | 30 Å |
| ZnSnO (layer 12) | 30-130 Å | 50-80 Å | 58 Å or 64 Å |
| $ZnAlO_x$ (layer 13) | 80-250 Å | 130-240 Å | 179 Å |
| $Si_3N_4$ (layer 15) | 50-350 Å | 80-200 Å | 146 Å or 189 Å |
| $ZrO_2$ (layer 16) | 10-60 Å | 20-40 Å | 33 Å |

In certain example embodiments of this invention, coated articles according to the FIG. 1 and/or FIG. 2 embodiments herein may have the following characteristics set forth in Table 3 when measured monolithically or in an IG window unit, and these values refer to both heat treated and non-heat treated embodiments. Note that $E_n$ is normal emissivity/emittance.

TABLE 3

Low-E/Solar Characteristics (HT or non-HT)

| Characteristic | General | More Preferred | Most Preferred |
|---|---|---|---|
| $R_s$ (ohms/sq.): | <=8.0 | <=7.0 | <=5.0 |
| $E_n$: | <=7% | <=6% | <=5% or <=4% |

Moreover, coated articles including coatings according to the FIG. 1 and FIG. 2 embodiments of this invention have the following optical/color/thermal stability characteristics (e.g., when the coating(s) is provided on a clear soda lime silica glass substrate 1 from 1 to 10 mm thick, preferably about 4 mm thick such as 3.8 mm thick), as shown in Table 4 below. In Table 4, all parameters are measured monolithically. Note that "f" stands for film side, and "g" stands for glass side. Thus, $R_fY$ is film side reflectance, which is visible reflectance measured form the film side of the coated substrate. And $R_gY$ is glass side reflectance, which is visible reflectance measured form the glass side of the coated substrate. Film side reflectance, and film side reflective color values $a^*_f$ and $b^*_f$ are typically deemed to be the most important when the coating 25 is provided on surface three of an IG window unit because this indicates how the outside of the building will appear. Note that $\Delta E^*$ is a value indicative of thermal stability, and in particular how much the optical characteristics changes upon heat treatment (HT). The lower a $\Delta E^*$ value, the less the applicable $a^*$, $b^*$ and $L^*$ values change upon HT (e.g., thermal tempering). The low $\Delta E^*$ values of the coatings discussed herein demonstrate that HT and non-HT versions of each coating substantially matching with respect to coloration. Note that the equation for determining $\Delta E^*$ is known in the art and is described for example in U.S. Pat. No. 8,263,227, the disclosure of which is hereby incorporated herein by reference. It has surprisingly been found that the combination of the zinc stannate, zinc oxide, and zirconium silicon oxynitride in the lower dielectric stack reduces $\Delta E^*$ values in a desirable manner making the coatings more thermally stable.

TABLE 4

Example Optical Characteristics (Monolithic, HT or non-HT)

| Characteristic | General | More Preferred |
|---|---|---|
| $T_{vis}$ (or TY)(Ill. C, 2 deg.): | >=75% | >=80% or >=86% |
| $a^*_t$ (Ill. C, 2°): | −5.0 to +1.0 | −3.0 to 0.0 |
| $b^*_t$ (Ill. C, 2°): | −2.0 to +6.0 | 0.0 to +4.0 |
| $R_fY$ (Ill. C, 2 deg.): | <=18% | <=8% or <=6% |
| $a^*_f$ (Ill. C, 2°): | −5.0 to +8.0 | −2.0 to +3.0 |
| $b^*_f$ (Ill. C, 2°): | −14.0 to +10.0 | −11.0 to +1.0 |
| $\Delta E^*_f$: | <=4.0 or <=2.0 | <=1.5 |
| $R_gY$ (Ill. C, 2 deg.): | <=20% | <=8% |
| $a^*_g$ (Ill. C, 2°): | −5.0 to +5.0 | −2.0 to +3.0 |
| $b^*_g$ (Ill. C, 2°): | −15.0 to +10.0 | −11.0 to 0 |
| $\Delta E^*_g$: | <=2.5 or <=2.0 | <=1.5 |

Moreover, coated articles including coatings according to the FIG. 1 and FIG. 2 embodiments have the following optical characteristics when the coated article is provided in an IG window unit in certain example embodiments (see Table 5 below). These measurements are with respect to, for example and for purposes of reference, coating 25 being provided in an IG window unit where both glass substrates 1, 22 are clear soda lime silica glass substrates about 3.8 mm thick, coating 25 is on surface three of the IG unit as shown in FIG. 3, and when the gap between the substrates is about 16 mm thick and is filled with a mixture of air and argon gas. Note that U-value is measured and referred to in accordance with EN 410-673_2011—Winter.

TABLE 5

Example Optical Characteristics (IG Unit; HT or non-HT)

| Characteristic | General | More Preferred |
|---|---|---|
| $T_{vis}$ (or TY)(Ill. C, 2 deg.): | >=68% or >=70% | >=78% or >=79% |
| $a^*_t$ (Ill. C, 2°): | −5.0 to +1.0 | −3.0 to 0.0 |
| $b^*_t$ (Ill. C, 2°): | −2.0 to +6.0 | 0.0 to +4.0 |
| $R_{outside}Y$ (Ill. C, 2 deg.): | <=25% | <=14% |
| $a^*_{outside}$ (Ill. C, 2°): | −5.0 to +8.0 | −2.0 to +3.0 |
| $b^*_{outside}$ (Ill. C, 2°): | −10.0 to +10.0 | −7.0 to +4.0 |
| $R_{interior}Y$ (Ill. C, 2 deg.): | <=25% | <=14% |
| $a^*_{interior}$ (Ill. C, 2°): | −5.0 to +5.0 | −2.0 to +3.0 |
| $b^*_{interior}$ (Ill. C, 2°): | −12.0 to +10.0 | −7.0 to 0 |
| U-value (W/(m²K)): | <=1.4 or <=1.3 | <=1.1 or <=1.0 |

Examples

Examples 1-8 are provided for purposes of example only, and are not intended to be limiting. The following Examples 1-8 were made via sputtering to have the layers set forth below from the clear glass substrate 1 outwardly. They were measured monolithically, heat treated and then measured again. They were also put into IG window units as shown in FIG. 3. The silicon nitride layers were deposited by sputtering a silicon target (doped with about 8% Al) in an atmosphere including argon and nitrogen gas. Layer thicknesses below in Table 6 are in units of angstroms (Å).

TABLE 6

Layer Stacks of Examples

| Layer | Examples 1-4 | Example 5 | Examples 6-8 |
|---|---|---|---|
| $ZrSiO_xN_y$ (layer 2) | 74 Å | 74 Å | 74 Å |
| $TiO_x$ (layer 3) | 30 Å | 36 Å | 36 Å |
| ZnSnO (layer 5) | 53 Å | 31 Å | 22 Å |
| $ZnAlO_x$ (layer 7') | 48 Å | n/a | n/a |
| ZnSnO (layer 5') | 41 Å | n/a | n/a |
| $ZnAlO_x$ (layer 7) | 123 Å | 88 Å | 73 Å |
| Ag (layer 9) | 87 Å | 115 Å | 196 Å |
| $NiCrO_x$ (layer 11) | 30 Å | 30 Å | 30 Å |
| ZnSnO (layer 12) | 66 Å | 64 Å | 58 Å |
| $ZnAlO_x$ (layer 13) | 170 Å | 179 Å | 179 Å |
| $SnO_2$ (layer 14) | 55 Å | n/a | n/a |
| $Si_3N_4$ (layer 15) | 111 Å | 146 Å | 189 Å |
| $ZrO_2$ (layer 16) | 30 Å | 33 Å | 33 Å |

Measured monolithically before tempering (HT), Examples 1-8 had the following characteristics (annealed and non-HT, monolithic) (Ill. C, 2 degree observer).

TABLE 7

| | Monolithic, annealed (before tempering) | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| $T_{vis}$ (or TY): | 88% | 88% | 88% | 88% | 87% | 77% | 76% | 75% |
| $a^*_t$: | −1.5 | −1.4 | −1.4 | −1.5 | −2.0 | −3.2 | −3.5 | −3.2 |
| $b^*_t$: | 2.6 | 2.4 | 2.5 | 2.6 | 3.9 | 5.2 | 5.2 | 5.2 |
| $R_fY$: | 5% | 5% | 5% | 5% | 5% | 15% | 16% | 16% |
| $a^*_f$: | 0.2 | −0.5 | −0.2 | −0.5 | 1.8 | 5.1 | 5.6 | 4.7 |
| $b^*_f$: | −10.6 | −9.5 | −9.6 | −7.6 | −12.5 | −12.0 | −11.5 | −10.7 |
| $R_gY$: | 6.5% | 6.5% | 6.5% | 6% | 7% | 18% | 19% | 19.5% |
| $a^*_g$: | −0.2 | −0.7 | −0.5 | −0.4 | 0.7 | 3.2 | 3.7 | 2.9 |
| $b^*_g$: | −10.9 | −10.0 | −10.1 | −9.4 | −12.1 | −10.4 | −9.9 | −9.5 |
| $E_n$: | 5.8% | 6.0% | 6.2% | 6.6% | 4.4% | 2.7% | 2.4% | 2.6% |

The coated articles of Examples 1-8 were then thermally tempered (heat treated), and then were again measured monolithically after such HT and had the following characteristics (HT, monolithic) (Ill. C, 2 degree observer). Note that glass side reflective ΔE* was 1.1 for Example 4, and that film side reflective ΔE* was 0.95 for Example 4. Also, note that glass side reflective ΔE* was 2.1 for Example 5, and that film side reflective ΔE* was 1.7 for Example 5. Also, note that glass side reflective ΔE* was 2.2 for Example 8, and that film side reflective ΔE* was 3.7 for Example 8.

TABLE 8

| | Monolithic, Heat Treated (thermally tempered) | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| $T_{vis}$ (or TY): | 90% | 90% | 90% | 90% | 89% | 79% | 78% | 77% |
| $a^*_t$: | −1.2 | −1.2 | −1.1 | −1.1 | −1.9 | −3.2 | −3.5 | −3.4 |
| $b^*_t$: | 1.9 | 1.8 | 1.8 | 1.9 | 2.9 | 4.2 | 4.0 | 3.7 |
| $R_fY$: | 5% | 5% | 6% | 5% | 6% | 16% | 17% | 18% |
| $a^*_f$: | 0.4 | −0.2 | −0.3 | −0.8 | 2.8 | 5.2 | 6.0 | 5.5 |
| $b^*_f$: | −10.8 | −10.2 | −9.9 | −8.5 | −12.0 | −10.1 | −9.3 | −7.6 |
| $R_gY$: | 6.2% | 6.2% | 6.3% | 5.9% | 7% | 18% | 19% | 20% |
| $a^*_g$: | 0.5 | 0.0 | −0.3 | −0.1 | 2.7 | 4.4 | 3.6 | 4.7 |
| $b^*_g$: | −10.9 | −10.4 | −10.1 | −9.8 | −12.5 | −9.9 | −9.4 | −8.2 |
| $E_n$: | 4.3% | 4.5% | 4.7% | 4.8% | 3.4% | 1.9% | 1.8% | 1.9% |

The coated articles of Examples 1-8, before being thermally tempered, were put in IG window units on surface three as shown in FIG. 3, and the IG window units had the following characteristics (Ill. C, 2 degree observer). In the IG window units, for purposes of reference, the glass substrates 1 and 22 were clear and 3.8 mm thick, and the air gap in the IG window unit was 16 mm thick and filled with a mixture of air and argon gas.

In certain example embodiments of this invention, there is provided a coated article including a coating supported by a glass substrate, the coating comprising moving away from the glass substrate: a dielectric layer comprising zirconium silicon oxynitride; a layer comprising titanium oxide; a layer comprising zinc stannate; a layer comprising zinc oxide located over and directly contacting the layer comprising zinc stannate; an infrared (IR) reflecting layer comprising silver located on the substrate over and directly contacting the layer comprising zinc oxide; and a layer comprising metal oxide located over at least the IR reflecting layer comprising silver; wherein the coating contains only one silver based IR reflecting layer; wherein the coating has a normal emissivity ($E_n$) of no greater than 7% (more preferably no greater than 6%, possibly no greater than 4% or 5%), and measured monolithically the coated article has a visible transmission of at least 75% (more preferably of at least 80%, and most preferably of at least 86%).

TABLE 9

| | IG Window Unit, Annealed (non-HT) | | | | | | | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| $T_{vis}$ (or TY): | 80% | 80% | 80% | 80% | 79% | 71% | 70% | 69% |
| $a^*_t$: | −2.0 | −2.0 | −2.0 | −2.1 | −2.6 | −3.7 | −3.9 | −3.6 |
| $b^*_t$: | 2.4 | 2.3 | 2.4 | 2.4 | 3.7 | 4.8 | 4.8 | 4.8 |
| $R_fY$: | 13% | 13% | 13% | 13% | 14% | 23% | 24% | 24% |
| $a^*_f$: | −0.2 | −0.5 | −1.2 | −1.1 | −0.6 | 1.8 | 2.1 | 1.6 |
| $b^*_f$: | −5.8 | −5.2 | −5.9 | −5.4 | −7.2 | −7.9 | −7.5 | −7.4 |
| $R_gY$: | 13% | 13% | 13% | 13% | 13% | 21% | 22% | 22% |
| $a^*_g$: | −1.0 | −1.3 | −0.5 | −0.5 | 0.5 | 2.9 | 3.3 | 2.7 |
| $b^*_g$: | −6.5 | −5.9 | −5.2 | −4.2 | −6.9 | −8.7 | −8.5 | −8.0 |
| U-Value: | 1.2% | 1.2% | 1.2% | 1.2% | 1.2% | 1.1% | 1.0% | 1.1% |

In the coated article of the immediately preceding paragraph, the layer comprising zirconium silicon oxynitride may contain at least three times as much nitrogen as oxygen, more preferably at least four times as much nitrogen as oxygen, and most preferably at least five times as much nitrogen as oxygen.

In the coated article of any of the preceding two paragraphs, a ratio of Zr/Si (atomic) may be from 0.30 to 0.47, more preferably from 0.35 to 0.44, in the layer comprising zirconium silicon oxynitride.

In the coated article of any of the preceding three paragraphs, the layer comprising titanium oxide may be located over and directly contacting the layer comprising zirconium silicon oxynitride.

The coated article of any of the preceding four paragraphs may further comprise a layer comprising silicon nitride located between the glass substrate and the layer comprising zirconium silicon oxynitride.

In the coated article of any of the preceding five paragraphs, the layer comprising zirconium silicon oxynitride may be from about 40-250 (or 20-250) Å thick, more preferably from about 50-100 Å thick.

In the coated article of any of the preceding six paragraphs, the layer comprising titanium oxide may be from about 15-150 Å thick, more preferably from about 20-60 Å thick.

In the coated article of any of the preceding seven paragraphs, (a) the layer comprising zinc stannate may be located over and directly contacting the layer comprising titanium oxide, or (b) the coating may further comprise, below said layer comprising zinc stannate and above said layer comprising titanium oxide, another layer comprising zinc stannate and another layer comprising zinc oxide, where said another layer comprising zinc stannate directly contacts said layer comprising titanium oxide.

In the coated article of any of the preceding eight paragraphs, the layer comprising metal oxide may comprise an oxide of Ni and/or Cr and may be located directly over and contacting the IR reflecting layer comprising silver.

In the coated article of any of the preceding nine paragraphs, the coating may further comprise one or more of: (i) at least one another layer comprising zinc stannate and another layer comprising zinc oxide located over the IR reflecting layer comprising silver; (ii) a layer comprising silicon nitride located over the another layer comprising zinc oxide; and/or (iii) a layer comprising tin oxide located between the another layer comprising zinc oxide and the layer comprising silicon nitride.

The coated article of any of the preceding ten paragraphs may or may not be heat treated (e.g., thermally tempered).

The coated article of any of the preceding eleven paragraphs may have, measured monolithically, a film side reflective ΔE* value of <=4.0 (more preferably <=2.0, and most preferably <=1.5) due to heat treatment (e.g., thermal tempering).

The coated article of any of the preceding twelve paragraphs may have, measured monolithically, a glass side reflective ΔE* value of <=2.5 (more preferably <=2.0, and most preferably <=1.5) due to heat treatment (e.g., thermal tempering).

An IG window unit may include the coated article of any of the preceding thirteen paragraphs, wherein the IG window unit has a U-value of no greater than 1.4 (more preferably no greater than 1.1), the IG window unit further comprising another glass substrate, and wherein the coating may be on surface three of the IG window unit.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A coated article including a coating supported by a glass substrate, the coating comprising moving away from the glass substrate:
   a dielectric layer comprising zirconium silicon oxynitride;
   a layer comprising titanium oxide;
   a layer comprising zinc stannate;
   a layer comprising zinc oxide located over and directly contacting the layer comprising zinc stannate;
   an infrared (IR) reflecting layer comprising silver located on the substrate over and directly contacting the layer comprising zinc oxide; and
   a layer comprising metal oxide located over at least the IR reflecting layer comprising silver;
   wherein the coating contains only one silver based IR reflecting layer;
   wherein the coating has a normal emissivity ($E_n$) of no greater than 7%, and measured monolithically the coated article has a visible transmission of at least 75%.

2. The coated article of claim 1, wherein the layer comprising zirconium silicon oxynitride contains at least three times as much nitrogen as oxygen.

3. The coated article of claim 1, wherein the layer comprising zirconium silicon oxynitride contains at least four times as much nitrogen as oxygen.

4. The coated article of claim 1, wherein a ratio of Zr/Si (atomic) is from 0.30 to 0.47 in the layer comprising zirconium silicon oxynitride.

5. The coated article of claim 1, wherein a ratio of Zr/Si (atomic) is from 0.35 to 0.44 in the layer comprising zirconium silicon oxynitride.

6. The coated article of claim 1, wherein the layer comprising titanium oxide is located over and directly contacting the layer comprising zirconium silicon oxynitride.

7. The coated article of claim 1, further comprising a layer comprising silicon nitride located between the glass substrate and the layer comprising zirconium silicon oxynitride.

8. The coated article of claim 1, wherein the layer comprising zirconium silicon oxynitride is from about 20-250 Å thick.

9. The coated article of claim 1, wherein the layer comprising zirconium silicon oxynitride is from about 50-100 Å thick.

10. The coated article of claim 1, wherein the layer comprising titanium oxide is from about 15-150 Å thick.

11. The coated article of claim 1, wherein the layer comprising titanium oxide is from about 20-60 Å thick.

12. The coated article of claim 1, wherein the layer comprising zinc stannate is located over and directly contacting the layer comprising titanium oxide.

13. The coated article of claim 1, further comprising, below said layer comprising zinc stannate and above said layer comprising titanium oxide, another layer comprising zinc stannate and another layer comprising zinc oxide.

14. The coated article of claim 13, wherein said another layer comprising zinc stannate directly contacts said layer comprising titanium oxide.

15. The coated article of claim 1, wherein the coating has a normal emissivity ($E_n$) of no greater than 6%.

16. The coated article of claim 1, wherein measured monolithically the coated article has a visible transmission of at least 86%.

17. The coated article of claim 1, wherein the layer comprising metal oxide comprises an oxide of Ni and/or Cr and is located directly over and contacting the IR reflecting layer comprising silver.

18. The coated article of claim 1, further comprising another layer comprising zinc stannate and another layer comprising zinc oxide located over the IR reflecting layer comprising silver.

19. The coated article of claim 18, further comprising a layer comprising silicon nitride located over the another layer comprising zinc oxide.

20. The coated article of claim 19, further comprising a layer comprising tin oxide located between the another layer comprising zinc oxide and the layer comprising silicon nitride.

21. The coated article of claim 1, wherein the coated article is heat treated and has a film side reflective ΔE* value of no greater than 4.0 due to the heat treatment.

22. The coated article of claim 1, wherein the coated article is heat treated and has a film side reflective ΔE* value of no greater than 2.0 due to the heat treatment.

23. The coated article of claim 1, wherein the coated article is heat treated and has a glass side reflective ΔE* value of no greater than 2.5 due to the heat treatment.

24. The coated article of claim 1, wherein the coated article is heat treated and has a glass side reflective ΔE* value of no greater than 2.0 due to the heat treatment.

25. The coated article of claim 1, wherein the coated article is heat treated and has a glass side reflective ΔE* value of no greater than 1.5 due to the heat treatment.

26. An IG window unit comprising the coated article of claim 1, wherein the IG window unit has a U-value of no greater than 1.4, the IG window unit further comprising another glass substrate, and wherein the coating is on surface three of the IG window unit.

27. An IG window unit comprising the coated article of claim 1, wherein the IG window unit has a U-value of no greater than 1.1, the IG window unit further comprising another glass substrate, and wherein the coating is on surface three of the IG window unit.

28. An IG window unit comprising:
first and second glass substrates with a gap therebetween;
a coating supported by the second glass substrate and facing the gap, the second glass substrate to be located closer to a building interior than is the first glass substrate, the coating comprising moving away from the second glass substrate:
a dielectric layer comprising zirconium silicon oxynitride;
a layer comprising titanium oxide;
a layer comprising zinc stannate;
a layer comprising zinc oxide located over and directly contacting the layer comprising zinc stannate;
an infrared (IR) reflecting layer comprising silver located on the substrate over and directly contacting the layer comprising zinc oxide; and
a layer comprising metal oxide located over at least the IR reflecting layer comprising silver;
wherein the coating contains only one silver based IR reflecting layer;
wherein the coating has a normal emissivity ($E_n$) of no greater than 7%;
wherein the IG window unit has a visible transmission of at least 70% and a U-value of no greater than 1.4.

* * * * *